United States Patent [19]

Broder

[11] Patent Number: 5,974,481
[45] Date of Patent: Oct. 26, 1999

[54] METHOD FOR ESTIMATING THE PROBABILITY OF COLLISIONS OF FINGERPRINTS

[75] Inventor: Andrei Zary Broder, Menlo Park, Calif.

[73] Assignee: Digital Equipment Corporation, Maynard, Mass.

[21] Appl. No.: 08/929,832

[22] Filed: Sep. 15, 1997

[51] Int. Cl.[6] .............................. G06F 12/04; G06F 9/305; G06F 9/315

[52] U.S. Cl. .............................. 710/49; 710/68; 707/513; 707/524

[58] Field of Search .......................... 364/715.11, 715.09; 395/200.75, 835, 626, 860, 20.72; 707/512, 513, 6, 524, 540; 370/392; 463/16; 382/294, 221; 711/212, 216; 710/49, 68

[56] References Cited

U.S. PATENT DOCUMENTS 5,570,306 10/1996 Soo ..................................... 364/715.11
5,761,440  6/1998 De Marco et al. ................. 395/200.75

OTHER PUBLICATIONS

Michael O. Rabin; "Probabilistic Algorithms In Finite Fields" Society for Industrial and Applied Mathematics; Journal of Computing; vol. 9. No. 2,; pp. 273–280; May 1980.

J. Lawrence Carter and Mark N. Wegman; "Universal Classes of Hash Functions"; Journal of Computer and System Sciences 18; pp. 143–154; 1979.

Andrei Z. Broder; "Some applications of Rabin's fingerprinting method"; Sequences II: Methods in Communications, Security, and Computer Science; pp. 1–10 1993.

Primary Examiner—Daniel H. Pan
Attorney, Agent, or Firm—Pennie & Edmonds LLP

[57] ABSTRACT

Strings, such as Web pages or other documents, are fingerprinted in order to detect substantially similar strings, so as to avoid processing duplicate strings. At the same time determine a computerized method estimates the probability that a collision among fingerprints of dissimilar strings. As fingerprints are generated for strings presented for processing, when the fingerprint of a string is determined not to be identical to any fingerprint in a set of stored fingerprints, the new fingerprint is masked and the unmasked portion of the fingerprint is compared with a corresponding portion of the fingerprints in the stored set. Information is recorded regarding the number of matching masked fingerprints.

8 Claims, 2 Drawing Sheets

METHOD FOR ESTIMATING THE PROBABILITY OF COLLISIONS OF FINGERPRINTS

FIELD OF THE INVENTION

This invention relates generally to identifying arbitrary bit strings, and more particular to using fingerprints to identify the bit strings.

BACKGROUND OF THE INVENTION

It is common to use "fingerprints" to identify data records such as bit strings and character strings. A fingerprint is generated when, for example, a polynomial or hash function is applied to a data record to produce a relatively small bit string which is strongly dependent on the content of the record.

With a good fingerprinting scheme, data records having different content will most likely produce different fingerprints. As an advantage, fingerprints provide a way for identifying data records without any sort of central management, i.e., the identification arises purely from the content of the records themselves. Simple fingerprinting schemes are based on the probabilistic assumption that there is some level of randomness in the input data records.

More sophisticated schemes, such as Rabin fingerprints and strong universal hashing, do not assume anything about the input. In generally, an arbitrary set of bit strings records is first chosen for fingerprinting, and second, a function is randomly selected from some family of fingerprinting functions. Then, the selected function is applied to the set of target bit strings. See, M. Rabin, "Probabilistic Algorithms in Finite Fields," SIAM Journal of Computing, Vol. 9, No. 2, pp. 273–280, 1980, and Carter et al., "Universal Classes of Hash Functions, JCSS 18 pp. 143–154, 1979. In practice, the assumption is violated to some extent because usually the function is chosen first at a time when the set of bit strings records is still unknown.

Fingerprints can be used in a variety of applications, see A. Broder, "Some applications of Rabin's fingerprinting method," Sequences II, Methods of Communications, Security, and Computer Science, pp. 143–152, Springer-Verlag, 1993. For example, fingerprints can be used to identify World-Wide-Web (WEB) pages for "Web" search engines. For instance, the AltaVista search engine from Digital Equipment Corporation uses fingerprints to identify the millions of Web pages for which it maintains a comprehensive full-word index. Thus, when a page is located at a "new" Universal Resource Location (URL), a determination can be made, by comparing fingerprints of the content, whether or not the page has been previously indexed. Because a large proportion of Web pages are duplicates, this check can save considerable amount of storage space.

However, there is a small probabilistic chance that different data records produce identical fingerprint. This is called a collision. Obviously, increasing the number of bits used for a fingerprint decreases the probability that a collision will occur. However, increasing the number of bits in a fingerprint increases the time required to generate the fingerprint and the amount of memory required to store the fingerprint. It always is possible to directly compare the records themselves, but for large records this also would be computationally expensive.

In order to deal with the possibility of collisions, two fingerprints can be maintained. If two data records have identical first fingerprints, then a comparison can be made on second fingerprints generated for the records using a different fingerprinting function. However, adding a second fingerprint substantially increases storage requirements. For example, for the AltaVista search engine, a second eight byte fingerprint would require an additional 800 MB of memory, increasing the cost of the system considerably.

In order to better evaluate fingerprinting techniques, it is desired to estimate the probability of collisions of fingerprints.

SUMMARY OF THE INVENTION

A computerized method is provided for estimating the probability of collisions among fingerprints of a plurality of arbitrary bit strings. The bit strings can be any type of arbitrary data records, such as Web HTML pages.

Fingerprints are produced for each of the bit strings. Any conventional fingerprinting technique for which collision probabilities are desired can be used. During the normal processing of the fingerprints, the comparison of the fingerprints is enhanced as follows.

For any two fingerprints that are different, an identical pattern of bits of each of the different fingerprints are masked. In a simple implementation the mask pattern is eight bits, e.g., the least-significant byte. The masked fingerprints are then compared with each other.

If the masked fingerprints are identical, the two fingerprints are counted as a "near-collision." In addition, the number of bits different in the masked portion can be counted. Thus, the number of near-collisions for fingerprints having various number of bits in common can be counted to estimate the probability of exact collisions. This estimated probability can be use to determine if a current fingerprinting scheme is adequate for its purposes.

DETAILED DESCRIPTION OF PREFERRED EMBODIMENTS

Figure 1:
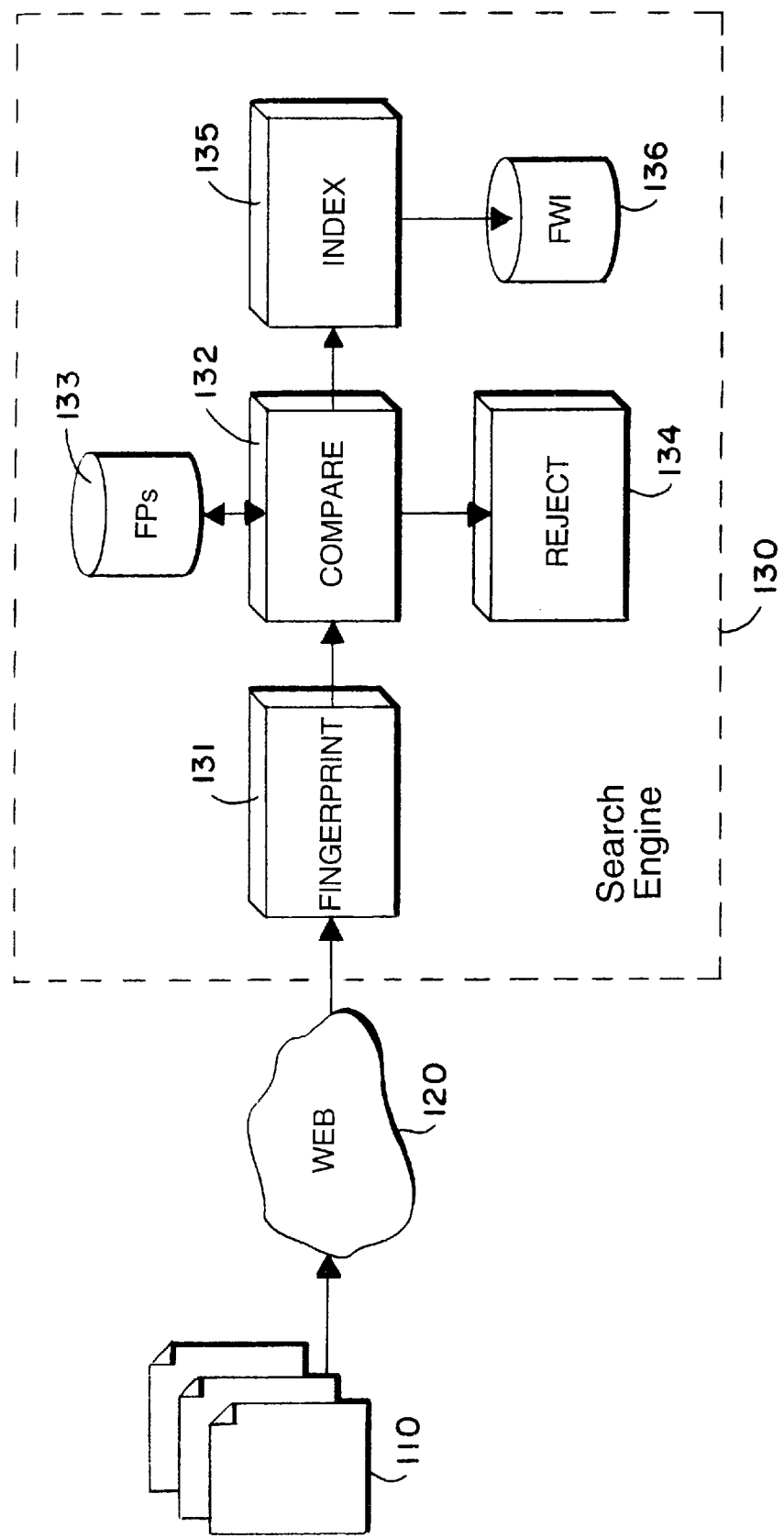
FIG. 1 is a block diagram of distributed computer system storing data records identified with fingerprints.

FIG. 1 shows an arrangement 100 which can use the fingerprint collision probability estimation method of the invention. A very large number of data records, for example, Web "HTML" pages 110, are maintained by many server computers connected to each other by the World-Wide-Web (the Web) 120. The number of pages 110 is numbered in the millions, with pages appearing and disappearing at a very high rate on a daily basis.

A search engine 130, for example, Digital's AltaVista search engine, periodically "scans" the Web using a "spider" to detect any new pages which have not yet been indexed. The location of a particular page 110 is specified by its Universal Resource Locator (URL). Therefore, a new URL might be an indication of a new page. However in practice, it is common that pages having identical content may be located at different URLs. In order to conserve storage in the search engine 130, it would be advantageous to not index duplicate pages, i.e., pages having identical content.

Therefore, each new candidate page is fingerprinted (131), and the fingerprint is compared (132) with fingerprints 133 of previously indexed pages. If the fingerprint of the candidate page is found to be identical, then the page is rejected (134), otherwise, the page is indexed (135) in a full word index (FWI) 136.

As described above, there is an extremely small probability that two different pages will produce identical fingerprints in what is called a collision. In order to evaluate the effectiveness of a fingerprinting scheme, it is desired that the probability of collisions is better understood, so that adjustments can be made. One way to do this would be to count the frequency of collisions. However, since collisions are going to be relatively rare, the rate of collisions may be so slow that it would take a long time to obtain any statistically meaningful results.

Therefore, according to the preferred embodiment of the invention, the fingerprinting step 131 is enhanced to count "near-collisions." Near-collisions should happen at a higher rate depending on the size of the "nearness" threshold. Here, near-collisions are defined as situations where two data records (e.g., Web pages 110) with different content have fingerprints which only differ in a small number of their bits, for example, the least significant eight bits. More generally, a near-collision is defined as a situation where two distinct bit strings have fingerprints separated by a very small Hamming distance.

Generally, the Hamming distance is a measure of the difference between bits or characters contained in two different data patterns. The Hamming distance is expressed by the number of bits or characters that need to be changed in one record in order to obtain the other. For example, the data records "0011" and "0101" have a Hamming distance of two, because only two bits need to be "flipped" to obtain one record from the other. The character strings "fingerprint" and "fingernails" are five characters apart, i.e., "print," and "nails".

Figure 2:
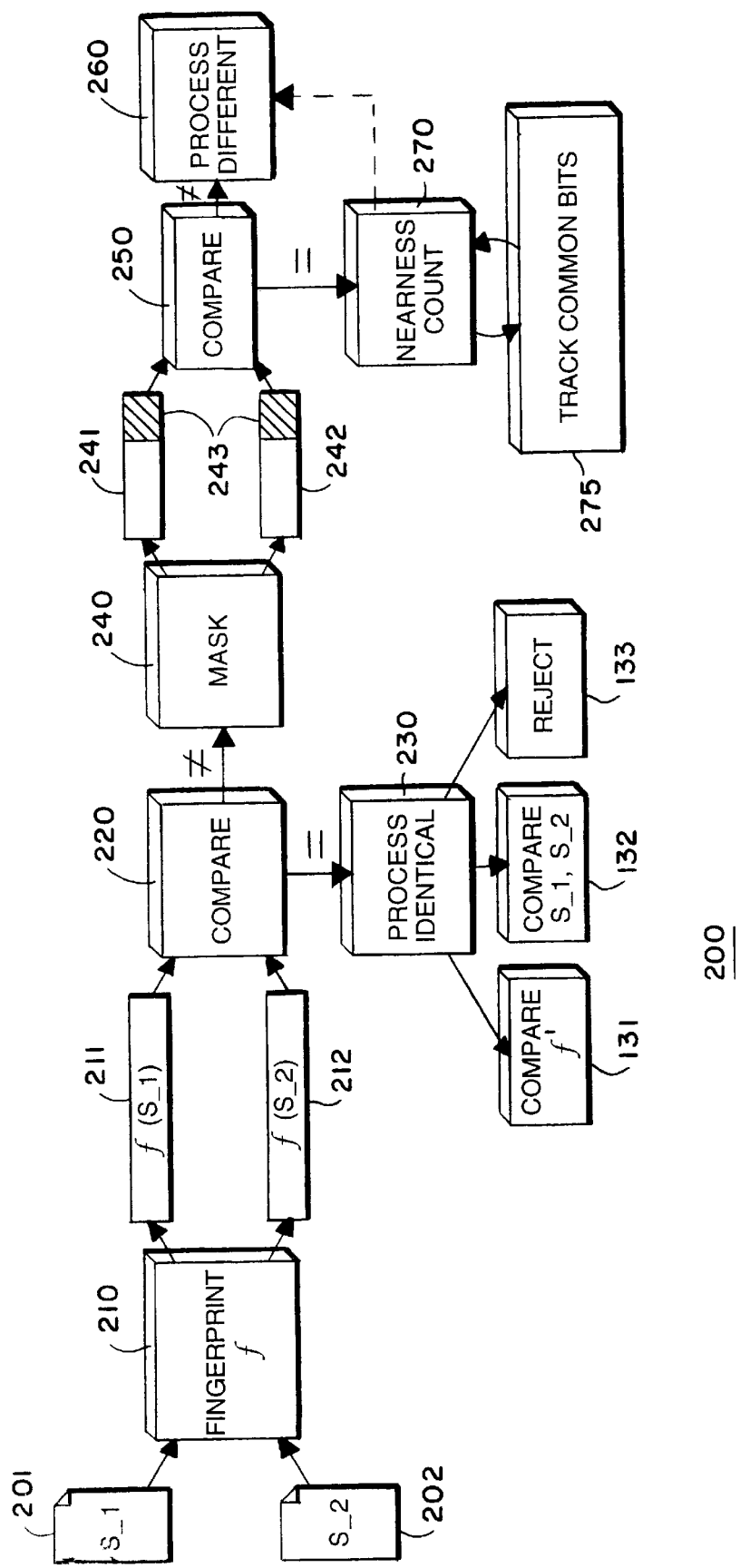
FIG. 2 is flow diagram of the estimating process according to the invention.

FIG. 2 shows the steps of the present process 200 for counting near-collisions. Bit strings S_1 201 and S_2 202 are both fingerprinted in step 210 by applying a fingerprinting function f to the strings 201–202. This produces fingerprints f(S-1) 211 and f(S_2) 212 of a fixed length, for example 64 bits.

The two fingerprints 211–212 are compared in step 220. If the two fingerprints are the identical, then the strings 201 and 202 are processed as identical records in step 230. This processing might involve the sub-steps of: comparing second fingerprints 131 using a function f comparing the entire strings S_1 and S_2, or rejecting one of the strings.

Otherwise, if the fingerprints 211–212 are different, then an identical pattern of bits of each fingerprint are masked out in step 240 to produce masked fingerprints 241–242. A convenient choice for the mask 242 is the low order byte (eight bits) of the fingerprints 201–202. Byte operations are easy to perform by most computer processors. However, it should be understood that any pattern of bits can be masked.

In step 250, the masked fingerprints 241–242 are compared. If the masked fingerprints are different, then the strings 201–202 are processed as different strings in step 260, for example, the underlying Web pages are indexed. Otherwise, in step 270, count the fingerprints as a near-collision. The strings 201–202 can subsequently be processed by step 260 as different strings.

A sub-step 275 of the counting step 270 can keep track the number of bits that are exactly common between the two fingerprints, i.e., count the number of bits in the masked portion 243 where the fingerprints 211 and 212 differ. In general, an exponential increase in the number of near-collisions is expected as the number of common bits decrease. For example, if x is the number of exact collisions for an 64 bit fingerprints, the number of near-collisions for 63 common bits should be 2x, and 4x for 62 common bits, and so forth. By selecting a mask of eight bits, a statistically significant profile of near-collisions can be produced with a minimal amount of overhead.

It should be understood, that other masking techniques can be used to count the relative number of times that different fingerprints share the same number of bits. Using a byte as a mask simplifies the implementation, and reduces the overhead for counting common bits, while still producing meaningful results.

By estimating the probability of near-collisions at various levels of common bits, it is possible to estimate the probability of exact collisions, and make a determination whether or not a particular fingerprinting scheme is suitable for the current purpose. The cost of implementing this scheme is quite low, step 240 and 250 can be implemented in two machine instructions. Because the occurrences of even near-collisions will be quite rare, step 270 is seldomly executed.

It is understood that the above-described embodiments are simply illustrative of the principles of the invention. Various other modifications and changes may be made by those skilled in the art which will embody the principles of the invention and fall within the spirit and scope thereof.

I claim:

1. A computer implemented method of detecting near-collisions of fingerprints of strings, comprising repeatedly performing the steps of receiving a string;

applying a one way function to the string to generate a fingerprint;

comparing the generated fingerprint with a set of fingerprints for previously processed strings to generate a comparison result;

processing the received string in accordance with the comparison result;

masking the generated fingerprint to generated a masked fingerprint, the masked fingerprint having an unmasked portion;

detecting near collisions of the generated fingerprint with the fingerprints for previously processed strings by comparing the unmasked portion of the fingerprint with a corresponding portion of the fingerprints for previously processed strings and storing near collision information for each fingerprint of a previously processed string that is not identical to the generated fingerprint and that matches the unmasked portion of the generated fingerprint.

2. The method of claim 1, wherein the received string is a web page having an associated URL and the previously processed strings are web pages each having an associate URL.

3. The method of claim 2, wherein the generated fingerprint consists of a bit string, the unmasked portion of the generated fingerprint comprises a contiguous portion of the bit string.

4. The method of claim 2, wherein:

the generated fingerprint consists of a bit string having a first, fixed number of bits, the masked fingerprint has a masked portion with a second, fixed number of bits; and the method includes:

for each fingerprint of a previously processed string that is not identical to the generated fingerprint and that matches the unmasked portion of the generated fingerprint, determining how many bits in the masked portion of the generated fingerprint are unequal to corresponding bits of the fingerprint of the previously processed string.

5. A computer program product for use in conjunction with a computer system, the computer program product comprising a computer readable storage medium and a computer program mechanism embedded therein, the computer program mechanism comprising:

a fingerprinting module for applying a one way function to a string to generate a fingerprint; and a fingerprint processing module, including:

a first comparison mechanism that compares the generated fingerprint with a set of fingerprints for previously processed strings to generate a comparison result, and directs subsequent processing of the string in accordance with the comparison result; and a second comparison mechanism that:

masks the generated fingerprint to generated a masked fingerprint, the masked fingerprint having an unmasked portion;

detects near collisions of the generated fingerprint with the fingerprints for previously processed strings by comparing the unmasked portion of the fingerprint with a corresponding portion of the fingerprints for previously processed strings; and stores near collision information for each fingerprint of a previously processed string that is not identical to the generated fingerprint and that matches the unmasked portion of the generated fingerprint.

6. The computer program product of claim 5, wherein the received string is a web page having an associated URL and the previously processed strings are web pages each having an associate URL.

7. The computer program product of claim 6, wherein the generated fingerprint consists of a bit string, the unmasked portion of the generated fingerprint comprises a contiguous portion of the bit string.

8. The computer program product of claim 6, wherein:

the generated fingerprint consists of a bit string having a first, fixed number of bits, the masked fingerprint has a masked portion with a second, fixed number of bits; and the second comparison mechanism a mechanism for determining, for each fingerprint of a previously processed string that is not identical to the generated fingerprint and that matches the unmasked portion of the generated fingerprint, how many bits in the masked portion of the generated fingerprint are unequal to corresponding bits of the fingerprint of the previously processed string.

* * * * *